Dec. 15, 1959   J. J. O'NEILL, JR., ET AL   2,916,776
ROCKET POWDER GRAIN
Filed Nov. 30, 1953
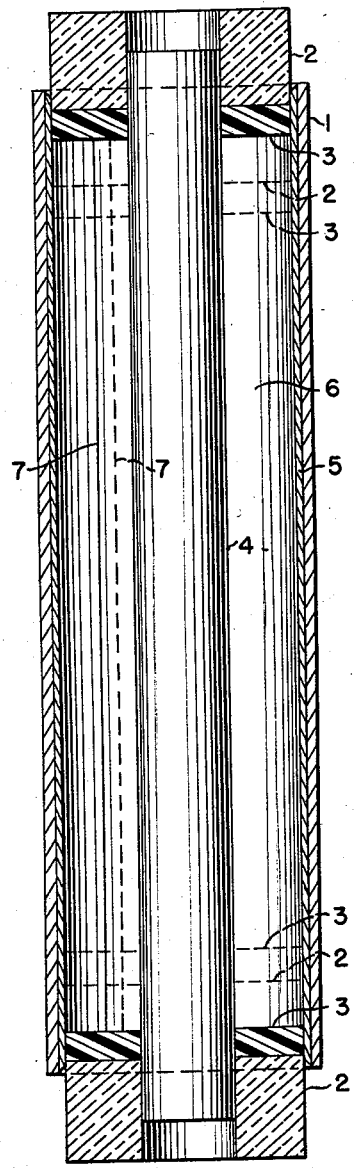
INVENTORS
JOHN J. O'NEILL, JR.
CHARLES EARNEST SILK 2,916,776
Patented Dec. 15, 1959

2,916,776

ROCKET POWDER GRAIN

John J. O'Neill, Jr., Roxana, and Charles E. Silk, Alton, Ill., assignors to Olin Mathieson Chemical Corporation, a corporation of Virginia Application November 30, 1953, Serial No. 395,014

3 Claims. (Cl. 18—55)

This invention relates generally to the molding of plastics, and is a continuation in part with respect to our copending application, Serial No. 76,842, filed February 16, 1949.

In the various techniques of plastic molding, it is common to subject the plastic molding material, while in a flowable condition, to increasing pressure so as to drive it into conformity with the source of a mold. Regardless of whether the molding material is thermal plastic or thermal setting, the molding material is subjected to changing temperature conditions while under compression. Where the compression is applied to the molding material by relative movement of two mold parts, or confining members, it is a common experience for the fluid molding material to seek exit between the relatively movable confining members with a result that when the article has been set, a "flash" of the molding material exhibits itself at the interface between the relatively movable confining members. Such a "flash" is usually removed from the molded body by cutting or abrading, but in any event, the mark of the removing tool is usually left upon the molded article. Most important is the fact that the molded article adjacent to the flash is usually defective due to the lessened pressure at that point. Accordingly, it is an object of this invention, generally stated, to eliminate such flashes.

Other objects and advantages will become apparent when the following description is read in connection with the accompanying drawing which is a diagrammatic view in longitudinal cross-section of a mold assembly utilized in practicing the invention in connection with the molding of a hollow cylinder.

In accordance with the present invention, plastic molding material, while in its flowable (i.e., fluid or semifluid) condition, is confined in at least one dimension by a solid plastic sheath. In the event that a sturdy mold, such as of metal, is provided, the sheath may be relatively thin material which readily conforms to the interior of the mold. In conjunction with such a sheath, a relatively movable plug or piston is provided which is also of plastic material, and has the same coefficient of thermal expansion, as the molding material and the sheath. Such a plastic plug is dimensioned to fit snugly to the interior of the sheath so that the plug may operate as a piston within the walls of the sheath in order to compress the molding material with the space confined in part by the sheath, and in part by the plug. While under such compression, the temperature on the assembly may be subjected to such changes as are necessary to effect setting of the molding material. The present invention is particularly characterized by the feature that the sheath and the plug are so coordinated with the molding material that all three (when in their solid condition) have substantially the same coefficient of thermal expansion. Accordingly, if the plug is made to fit snugly within the interior of the sheath at room temperature, it will also fit snugly within the interior of the sheath at elevated temperatures, and vice-versa. Thus, if the plug sufficiently closely fits the interior of the sheath to preclude the occurrence of flashes between the two members at one temperature within the operating range, it will do so at all temperatures. Furthermore, the emergence of the flowable molding material between the plug and the sheath may be inhibited with less tightness of fit between the last-mentioned parts where the latter are formed of materials which are not readily wettable by (i.e., having a high interface tension with) the flowable molding material.

While the invention is by no means limited thereto, the molding of hollow cylindrical propellant powder grains will serve to illustrate the invention. For the production of such a grain, the mold proper may consist of an open cylindrical, metallic tube 1, provided with a concentric cylindrical insert (which may be solid or tubular) as shown in the drawing. The insert 4 is arranged coaxially within the tube 1 and retained in that position by plugs 2 of brass. The members 1, 2 and 4 thus constitute the thrust-sustaining members of a mold proper within which other parts which actually define the shape of the plastic to be molded may be arranged.

Such other parts in the embodiment illustrated consist of a plastic lining 5 for the tube 1, and two plastic plugs 3. The lining 5 is in the form of a sheath, such as a sheet of cellulose acetate having a thickness on the order of about ⅛ of an inch. The length of the sheath 5 approximates the length of the tube 1 which is somewhat longer than that of the finished article to be molded. Thinner sheets of cellulose acetate may be utilized when some expedient is employed to hold the sheath in contiguity with the interior of tube 1. In fact, the sheath may be pre-formed into a tube of the desired size, but usually the sheath is formed by rolling a flat sheet into a cylinder and inserting it within the tube 1. Where it is desirable, the abutting edges of such a flat sheet may be skived to provide a scarfed joint as indicated by the lines 7—7 in the drawing.

The plastic plugs 3, at their outer periphery, are dimensioned to fit snugly within the inner periphery of the sheath 5 so as to provide therebetween a seal which is proof against the emergence therebetween of the plastic molding material when the latter is under compression. The edges of the sheath 5 at the ends of tube 1 may also be skived in order to facilitate the reception of plugs 3. While the invention is shown in the drawings as making use of two such plugs 3, it will be apparent that one will suffice if the sheath be provided with a stationary end wall.

Given a flat sheet of cellulose acetate, as aforesaid, for use as the sheath 5, the same may be skived as above indicated, and then conditioned for confirmation with the interior of tube 1. Such conditioning may be accomplished by placing the sheet in water at about 100° C. for about five minutes, and then upon removal from the water bath, wrapping the sheet around an expandable rubber mandrel having a diameter, unexpanded, of somewhat less than the interior diameter of tube 1. The rubber mandrel with the cellulose acetate sheet wrapped around it is then placed within the tube 1, and the sheet is then conformed to the inner contour of tube 1 by expanding the mandrel as with air pressure, and maintaining the pressure for about five minutes. If, prior to the introduction of the sheet into the tube 1, the skived edges 7—7 are wet with acetone, and the pressure of the expandable mandrel is maintained until the acetone vaporizes, the edges 7—7 will adhere to each other, thus forming a tube. The latter operation may be divided into two steps, however, and the solvent applied to the edges of the sheet after the mandrel is removed, by removing the sheet from the tube 1, and then reinserting it after the solvent is applied.

Where cellulose acetate is utilized as the sheath 5, and the molding material is of a composition whose coefficient of thermal expansion is substantially the same as cellulose acetate, the plug 3 may be formed of polystyrene or vinylidine chloride copolymer. It is desirable in this connection to form the plugs 3 of materials which do not readily bond with the plastic molding material because such materials usually exhibit a high surface tension toward the fluid molding materials, and hence reduce the tendency of the fluid molding material to creep past the edge of the plug 3. Of course, in cases where it is desired that the plug 3 remain a permanent part of the plastic article to be used, suitable treatments may be applied to activate the surface in contact with the molding material so that bonding can be achieved.

In cases where it is desired that the molding material be permanently adhered to the sheath 5, the latter is preferably activated by treatment with a plasticizer prior to the introduction of the plastic molding material into the space on the interior of the sheath 5. Such a plasticizer may be a cement consisting of cellulose acetate, plasticizer and acetone.

After conditioning the interior of the sheath 5, as aforesaid, if desired, the plastic molding material may be introduced into the mold space through one end or the other of tube 1, i.e., with one set of plugs 2 and 3 removed. For example, the lower plugs 2 and 3 may be arranged in the position shown in the drawing, while the upper plugs 2 and 3 are completely removed. All the interior of the mold may then be filled with the desired charge of plastic molding material which, in the case of propellant powder grains, may be of the composition indicated in our copending application aforesaid, in which particles have been surface-gelatinized by thorough mixing for fifteen minutes at 75° C. with a blend of a suitable solvent, such as a blend composed of 80% diethyldiphenylurea and 20% dimethyldiphenylurea. The resultant composition is in the form of a tacky mass wherein the surface of the individual particles are plasticized by the dialkyldiphenylureas.

After appropriately charging the space within the mold, the upper plugs 2 and 3 are applied in the relationship shown in the drawings, and the assembly subjected to the desired pressure applied endwise so as to move the two sets of plugs 2 and 3 toward each other until the mold material is reduced to the desired volume. If desired, the entire assembly may be subjected to changing temperature conditions concurrently with the application of pressure, but in any event, either before or after the mold material has been reduced to the desired volume, the temperature conditions are so changed as to consolidate the individual particles into one dense mass, and set the same. With a mold material of the character of the propellant powder above indicated, the consolidation and setting is accomplished by immersing the compressed mass and mold parts into a water bath at approximately 25° C. and heating the same to approximately 100° C., which latter temperature is maintained for about one and one-half hours; and then the temperature of the bath is gradually reduced to room temperature. Thereupon, the molded article with sheath 5 adhering thereto is forced out of the tube 1. In cases where it is desired that the sheath 5 remain intact with the molded article, the projecting end edges of the latter may be cut off, but otherwise the entire sheath is removed. Unless the plugs 3 have been pre-treated in order to make them bondable with the mold material, they are readily separated from the molded article. In either event, where the plugs 3 snugly fit the interior of sheath 5 at room temperature, there is no flash formed between the periphery of plug 3 and the interior of sheath 5.

While the invention has been described with propellant powder as an illustrative example of the molding material, it is to be understood that the invention is not limited thereto, but extends at large to the molding of plastics. Furthermore, the sheath 5 may be made of other plastic materials than cellulose acetate, such as ethyl cellulose, methyl methacrylate, and in fact any solid plastic material whose thermal properties do not substantially differ from that of the molding material and that of the disk 3. The disk 3 may, of course, be made of the same material as the sheath, but is preferably of sufficiently thick section to maintain its shape and maintain its sealing relationship against the interior of the sheath 5. Of course, in situations where it is desired that the disk 3 be readily removable from the molded article, but where it is desired that the sheath remain in situ on the exterior of the molded article, then the choice of materials is preferably such that the removable element does not bond readily with the molding material while the unremovable element does so bond.

From the foregoing description, those skilled in the art should readily understand the invention and appreciate the advantages thereof. While certain materials have been specified as illustrative, it is not to be understood that the invention is limited thereto, but on the contrary, extends to a great variety of plastic materials whose coefficients of thermal expansion are substantially the same.

Having thus described the invention, what is claimed and desired to be secured by Letters Patent is:

1. In the art of molding plastic materials, the process comprising, subjecting flowable plastic molding material to changing temperature while confined in one dimension by a solid plastic sheath and confined in the transverse dimension by a solid plastic member in contact with the interior of said sheath, said sheath, said member and said molding material all having substantially the same coefficient of thermal expansion.

2. In the art of molding plastic materials, the process comprising, subjecting flowable plastic molding material to changing temperature while confined in one dimension by a solid plastic sheath and confined in the transverse dimension by a solid plastic member in contact with the interior of said sheath, increasing the pressure on said molding material by moving said plastic member relative to said sheath, said pressure being less than sufficient to distort the sheath, said sheath, said member and said molding material all having substantially the same coefficient of thermal expansion.

3. In the manufacture of plastic articles, the process comprising, providing a plastic sheath, providing a charge of moldable plastic in the form of surface-plasticized particles, loading the surface-plasticized particles into the sheath, confining the particles endwise within the sheath by a plastic plug which snugly fits the interior of said sheath, and changing the temperature of the assembly while under such confinement, said plug, said sheath and said moldable plastic all having substantially the same coefficient of thermal expansion.

References Cited in the file of this patent

UNITED STATES PATENTS

| | | |
|---|---|---|
| 1,994,164 | Bailey | Mar. 12, 1935 |
| 2,313,985 | Bradshaw | Mar. 16, 1943 |
| 2,417,090 | Silk et al. | Mar. 11, 1947 |
| 2,475,321 | Horn | July 5, 1949 |